United States Patent [19]

Mason et al.

[11] 4,404,325

[45] Sep. 13, 1983

[54] HIGH IMPACT NYLON COMPOSITION CONTAINING COPOLYMER ESTERS AND IONIC COPOLYMERS

[75] Inventors: Charles D. Mason, Chatham; Harold W. Tuller, Long Valley, both of N.J.

[73] Assignee: Allied Corporation, Morris Township, Morris County, N.J.

[21] Appl. No.: 262,016

[22] Filed: May 11, 1981

[51] Int. Cl.³ .............................................. C08F 8/30
[52] U.S. Cl. .................................... 525/179; 525/183
[58] Field of Search ............................... 525/179, 183

[56] References Cited

U.S. PATENT DOCUMENTS

| | | | |
|---|---|---|---|
| 3,264,272 | 8/1966 | Rees | 525/221 |
| 3,373,224 | 3/1968 | Mesrobian | 525/179 |
| 3,845,163 | 10/1974 | Murch | 260/857 L |
| 4,035,436 | 7/1977 | Matsubara | 525/179 |
| 4,078,014 | 3/1978 | Starkweather | 525/179 |
| 4,160,790 | 7/1979 | Mason | 525/179 |
| 4,174,358 | 11/1979 | Epstein | 525/183 |
| 4,246,371 | 1/1981 | Meyer | 525/183 |
| 4,299,744 | 11/1981 | Stewart | 525/183 |

*Primary Examiner*—Melvyn I. Marquis
*Attorney, Agent, or Firm*—Richard A. Negin

[57] ABSTRACT

A polyamide composition comprising from about 46 percent to about 94 percent by weight polyamide, from about 5 percent to about 44 percent by weight random ionic copolymer, and from about 1 percent to about 12 percent by weight of an ester copolymer of ethylene and an ester of an alpha,beta-ethylenically unsaturated carboxylic acid. Preferably, the composition contains a metal cation containing material.

53 Claims, No Drawings

HIGH IMPACT NYLON COMPOSITION CONTAINING COPOLYMER ESTERS AND IONIC COPOLYMERS

BACKGROUND OF THE INVENTION

This invention relates to high impact resistant polyamide compositions containing ionic copolymers and ester copolymers.

Many approaches have been taken to improve the physical properties of nylon molding compositions. U.S. Pat. No. 3,264,272, U.S. Pat. No. 3,845,163 and U.S. Pat. No. 4,174,358 illustrate the use of ionic copolymers in polyamide molding compositions to improve physical properties. U.S. Pat. Nos. 4,160,790 and 3,472,916 disclose polyamide molding compositions containing copolymers of ethylene and alkyl acrylate esters for improved physical properties.

Polyamide compositions are known which contain up to about 25 percent by weight of ethylene-ethyl acrylate copolymers and the zinc salt or sodium salt of ethylene methacrylic acid copolymer. In these compositions, there is more ethylene-ethyl acrylate copolymer than the salt of ethylene methacrylic acid copolymer. Specifically, these compositions contain from 13 percent to 23 percent by weight of ethylene-ethyl acrylate, and from one percent to 12 percent by weight of the zinc salt or sodium salt of ethylene methacrylic acid copolymer.

SUMMARY OF THE INVENTION

The present invention is a composition comprising about 46 percent to about 94 percent by weight of a polyamide. There is about 5 percent to about 35 percent by weight of a random ionic copolymer of an alpha-olefin of the formula $RCH=CH_2$, where R is H or alkyl radicals having from 1 to 8 carbon atoms, and an alpha,-beta-ethylenically unsaturated carboxylic acid having from 3 to 8 carbon atoms. The ionic copolymer has at least 10 percent of the carboxylic acid groups neutralized with metal ions. There is about one percent to about 12 percent by weight of an ester copolymer of ethylene and an ester selected from the group of alkyl esters of alpha,beta-ethylenically unsaturated carboxylic acids having from 3 to 8 carbon atoms. The alkyl group contains 1 to 4 carbon atoms. There is a greater percent of the ionic copolymer than the ester copolymer.

An embodiment of the present invention has a composition comprising about 46 percent to about 74 percent by weight of a polyamide. There is about 15 percent to about 44 percent, and preferably about 20 percent to about 35 percent, by weight of ionic copolymer and from about 1 percent to about 12 percent, and preferably about 1 percent to about 8 percent, by weight of an ester copolymer.

Preferably, the composition can include from about 0.05 percent to about 1 percent by weight of a metal compound. Preferred metal compounds include magnesium oxide or antimony oxide.

DESCRIPTION OF THE PREFERRED EMBODIMENTS

The present invention is a composition which comprises a polyamide, an ionic copolymer, an ester copolymer, and optionally a metal compound. These materials are intimately mixed together by a method such as melt blending.

The term "polyamide" used in the present invention is intended to include long chain synthetic polymers which have regularly recurring amide groups as an integral part of the main polymer chain, and hence, includes amide-ester copolymers. Suitable polyamides can be prepared by polymerization of difunctional monomer or equivalently, its cyclized lactam (e.g., epsilon-aminocaproic acid or caprolactam, respectively) or by the reaction of a conjugate pair of monomers, for example, a diamide and a dicarboxylic acid (e.g., hexamethylenediamine and adipic acid), or a linear aminoaliphatic acid such as ω-amino undecanoic acid.

Suitable polycaprolactam can be produced by the polymerization of lactam monomers of the formula

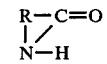

where R is an alkylene group having from 3 to 12 or more carbon atoms, preferably from 5 to 12 carbon atoms. A preferred monomer is epsiloncaprolactam having 5 carbon atoms in the alkylene group. Lactam monomers in addition to epsiloncaprolactam include pyrollidone, piperodone, valerolactam, caprylactam, lauryllactam, etc. Also included are copolymers of two or more of the above or similar lactam monomers. Suitable diamines useful in the polymerization of polyamides include propanediamine, hexamethylenediamine, octamethylenediamine, etc. Suitable polycarboxylic acids include acids such as adipic acid, pimelic, suberic, sebacic, dodecanoic, etc. Also included are copolymers or blends of polyamides of the above two categories.

Polyamides useful in the composition of the present invention preferably are polyepsiloncaprolactam, polyhexamethyleneadipamide, or mixtures thereof. Typically, the number average molecular weight of these polymers is between about 10,000 and about 50,000, preferably 15,000 to 40,000, and more preferably 20,000 to 30,000. This is because mechanical properties improve rapidly up to about 20,000 and processing starts becoming more difficult after 30,000.

Polyepsiloncaprolactam or polyhexamethyleneadipamide suitable for use herein can contain a variety of terminal functionality. Preferred terminal functionality is that containing:

(a) A carboxyl group attached to both ends of the polyamide chain;

(b) a carboxyl group attached to one end and an acetamide group attached to the other end of the polyamide chain;

(c) an amino group attached to both ends of the polyamide chain; and (d) a carboxyl group attached to one end and an amino group attached to the other end of the polyamide chain.

A preferred polyepsiloncaprolactam or polyhexamethyleneadipamide has a carboxyl group attached to one end and an amino group attached to the other end of the polyamide chain. Monocarboxylic acids or dicarboxylic acids, including acetic, azelaic or sebacic acids, can be used to terminate the amide chain. Preferably more than 50 percent to about 90 percent, and more preferably 60 percent to 80 percent, of the chain ends have carboxyl termination in acid terminated polyamides.

The ionic copolymer can be a random ionic copolymer of an alpha-olefin of the formula $RCH=CH_2$ where R is H or alkyl radicals having from 1 to 8 carbon atoms, and an alpha,beta-ethylenically unsaturated carboxylic acid having from 3 to 8 carbon atoms. The ionic copolymer has at least 10 percent of the carboxyl acid groups neutralized with metal ions. Random ionic copolymers which can be used in the composition of the present invention are described in U.S. Pat. No. 3,264,272, which is incorporated herein by reference.

The cations of metals which are suitable in forming the ionic copolymers which can be used in the present invention can include mono-, di- and trivalent ions of metals and Groups I, II, III, IV-A and VIII of the Periodic Table of the Elements. Suitable monovalent cations include cations of sodium, potassium, lithium, cesium, silver, mercury, and copper. Suitable divalent cations include the cations of beryllium, magnesium, calcium, strontium, barium, copper, cadmium, mercury, tin, lead, iron, cobalt, nickel, and zinc. Suitable trivalent cations include the cations of aluminum, scandium, and iron. For the purposes of the composition of the present invention, the most preferred metal cation used to form the ionic copolymer is the cation of zinc.

The degree of neutralization of the ionic copolymer by the metal cations should be at least 10 percent of the carboxylic acid groups. It is generally desirable to neutralize at least 50 percent of the acid groups. The degree of neutralization may be measured by several techniques known in the art, such as infrared analysis or titration. These techniques are disclosed at Pages 74–75 in "Ionic Copolymers" by L. Holliday, published by John Wiley and Sons, New York and Toronto (1975).

The copolymers which can be used to form the ionic copolymers of the present invention are preferably copolymers of ethylene and an alpha,beta-ethylenically unsaturated carboxylic acid. Alpha,beta-ethylenically unsaturated carboxylic acids which can be polymerized with the ethylene include acrylic acid, methacrylic acid, itaconic acid, and ethacrylic acid. Further, the ionic copolymers can be copolymers of the type described and used in U.S. Pat. No. 4,174,358, which is incorporated herein by reference.

The ester copolymer of the present invention is the copolymer of ethylene and an ester selected from the group of alkyl esters of alpha,beta-ethylenically unsaturated carboxylic acids having 3 to 8 carbon atoms, wherein the alkyl group contains 1 to 4 carbon atoms. Examples of such esters include methyl, ethyl, propyl, isopropyl, butyl, isobutyl, and t-butyl esters of the carboxylic acids. The preferred esters are methacrylate, ethyl acrylate, and methyl methacrylate and ethyl methacrylate. More preferred are ethyl acrylate and ethyl methacrylate, with ethyl acrylate being the most preferred.

The most preferred embodiments of the present invention include a polyamide, preferably polyepsiloncaprolactam or polyhexamethyleneadipamide, an ionic copolymer and ethylene-ethyl acrylate ester copolymer or ethylene methyl acrylate ester copolymer.

The composition of the present invention comprises about 46 percent to about 94 percent by weight of the polyamide. There is about 5 percent to about 35 percent by weight of a ionic copolymer having at least 10 percent of the carboxylic acid groups neutralized with metal ions. Preferably, the ionic copolymer has at least 50 percent of the carboxyl acid groups neutralized with zinc. Finally, there is up to about 12 percent by weight of an ester copolymer. The ester copolymer is preferably a copolymer of ethylene and an ester selected from the group of ethyl acrylate, methyl acrylate, ethyl methacrylate, and methyl methacrylate with the ethylene-ethyl acrylate ester copolymer being most preferred. There is a greater percent of the ionic copolymer than the ester copolymer.

An embodiment of the composition of the present invention comprises about 46 percent to about 74 percent by weight of the polyamide. There is about 15 percent to about 44 percent by weight of an ionic copolymer having at least 10 percent of the carboxylic acid groups neutralized with metal ions. Preferably, the ionic copolymer has at least 50 percent of the carboxylic acid groups neutralized with zinc cations. There is from 1 percent to about 12 percent by weight of an ester copolymer. Preferably, there is from about 57 percent to about 74 percent by weight of the polyamide, from about 20 percent to about 35 percent by weight of the random ionic copolymer, and from about 1 percent to about 8 percent by weight of the ester copolymer.

In the most preferred embodiment, there is from about 60 percent to about 72 percent by weight of a polyamide, from about 26 percent to about 34 percent by weight of ionic copolymer, and from about 2 percent to about 6 percent by weight of the copolymer.

As the sum of the weight percent of the ionic copolymer and the ester copolymer increases, the composition becomes more flexible and the impact resistance increases. The use of an ester copolymer improves the impact resistance at all levels. In a composition containing about 24 percent to about 28 percent by weight of the ionic copolymer and the ester copolymer, the flexural modulus (ASTM D-790) is about 230,000 to 280,000 psi and the Izod impact value (ASTM D-256) increase to about 15 to 19 foot pounds per inch of notch. In a composition containing about 40 weight percent of the ionic copolymer and the ester copolymer, the flexural modulus is about 210,000 psi and the Izod impact value is about 23 foot pounds per inch of notch.

It has been found that the addition of at least one metal compound further improves impact resistance. Metal compounds suitable for use as modifiers are those compounds wherein the metal or cation is selected from groups IA, IB, IIA, IIB, IIIA, IVA, VA, VIB, VIIB, and VIIIB of the Periodic Table of the Elements. Preferred metals are lithium, sodium, potassium, calcium, beryllium, magnesium, zinc, cadmium, strontium, aluminum, lead, chromium, molybdenum, manganese, iron, cobalt, germanium, nickel, copper, silver, mercury, tin, platinum, boron, antimony, copper manganese, zinc, lithium, calcium, and lead. Most preferred are antimony and magnesium. The anion portion of the metal compound is selected from the group consisting of oxides, hydrides, formates, acetates, alcoholates, glycolates and halides. More preferred are oxides, halides and acetates, and most preferred are oxides. Antimony trioxide dioxide and magnesium oxide are the most preferred metal compounds.

The metal compound is present in the instant polyamide compositions in an effective amount. The term "effective amount" is the amount of modifier required to increase the Izod impact resistance of molded articles of the present polyamide compositions. Generally, the amount of modifier required for such an increase ranges from about 0.05 percent to 1.0 percent by weight. The precise amount of modifier is dependent on such factors as concentration of each of the ingredients and the mixing or extruding conditions.

The compositions of the present invention may be modified by one or more conventional additives such as stabilizers and inhibitors of oxidative, thermal, and ultraviolet light degradation; lubricants, plasticizers, and mold release agents including dyes and pigments. Additionally, additives not deleterious to physical properties such as fibrous and particulate fillers and reinforcements nucleating agents can be added to the compositions of the present invention.

The compositions of the present invention are particularly useful for molding and can also be extruded to form film.

Several examples are set forth below to illustrate the nature of the invention and the manner of carrying it out. However, the invention should not be considered as being limited to the details thereof. All parts are percents by weight unless otherwise indicated.

The compositions in the following Examples were generally prepared by first dry blending the materials of each composition. Each dry blended composition was fed into the hopper of a 2½ inch NRM extruder having an L/D of 20. The extruder barrel temperatures were about: ZONE 1°—302° C. (575° F.); ZONE 2°—288° C. (550° F.); ZONE 3°—288° C. (550° F.); and ZONE 4°—260° C. (500° F.). The flange was set at about 232° C. (450° F.) and the die at about 221° C. (430° F.). The various blends were extruded at about 30 to 85 rpm. The extrudate was rapidly passed through a water bath. The strands were pressed through a pelletizing machine, and the pellets were collected. Test specimens were prepared on a Van Dorn molding machine set at a temperature from −1° C. (30° F.) to 32° C. (90° F.) above each composition melting point. The mold temperature was maintained at about 82° C. (180° F.). The molding cycle was 10 to 25 seconds forward ram, and 20 to 30 seconds on hold.

The melt index was determined according to ASTM D-1238 Condition Q. The impact values were tested according to ASTM D-256 notched Izod. The tensile and elongation were tested according to ASTM D-638, and the flexural modulus was tested according to ASTM D-790. Ionomer copolymers used in the following examples are Surlyns ® manufactured by the Du Pont Company. Description of the Surlyns used, in addition to the description in the Examples can be found in Du Pont's, *Select a Guide for Molding and Extrusion*, Surlyn Ionomer Resin, Form E-14884, printed in June 1977.

EXAMPLES 1 AND 2

Examples 1 and 2 are compositions of 86 percent by weight of nylon and 7 percent by weight of ethylene-ethyl acrylate copolymer, and 7 percent of an ionic copolymer. The polyamide used in Examples 1 and 2 was polyepsiloncaprolactam (nylon 6) having an excess of chain ends terminated with acetic acid. The ethylene-ethyl acrylate used was commercially available from Union Carbide under the trademark Bakelite Flexible Ethylene Copolymer DPD-6169. The ethylene-ethyl acrylate (EEA 6169) is described by Union Carbide as having a melt index of 6 grams/10 minutes and an ethyl acrylate content of 18 weight percent (about 5.8 mol percent). In Example 1 the ionic copolymer is Surlyn ® 1555 which is believed to be a sodium neutralized ethylene methacrylic acid copolymer, and possibly copolymerized with another monomer which is believed to be butyl methacrylate. The Surlyn 1555 has a melt flow index of 10.0 decigrams per minute and a specific gravity of 0.945.

Example 2 uses Surlyn ® 1650 which is an ionic copolymer neutralized with zinc ions. The copolymer which is neutralized is believed to be ethylene methacrylic acid. The Surlyn 1650 has a melt flow index of 1.5 decigrams per minute and a specific gravity of 0.95.

Table I below summarizes the results of polyepsiloncaprolactam plus EEA 6169 and Surlyn 1555 in Example 1, and polyepsiloncaprolactam plus EEA 6169 plus Surlyn 1650 in Example 2. Also included is the melt index and the percent water in the final composition.

TABLE I

|  | Ex. 1 | Ex. 2 |
|---|---|---|
| Nylon 6 | 86 | 86 |
| EEA 6169 | 7 | 7 |
| Surlyn 1555 (Sodium) | 7 | |
| Surlyn 1650 (Zinc) | | 7 |
| Yield Stress, psi | 10,080 | 9,990 |
| Yield Elongation, % | 5 | 5 |
| U. Tensile Strength, psi | 6,750 | 7,015 |
| U. Elong. % | 53 | 52 |
| Drop Wt. Impact, ft-lbs | 90.0 | 109.4 |
| Flex. Stress, psi | 12,360 | 12,139 |
| Flex. Mod. × 10$^{-5}$ psi | 3.39 | 3.23 |
| Izod fl-lbs/in. notch | 1.9 | 2.8 |
| Melt Index | 4.39 | 4.43 |
| Percent Water | 0.09 | 0.11 |

The physical properties measured indicate that formulations of Example 1 and Example 2 are substantially the same with one exception. The impact using the drop weight impact test as well as the Izod notched impact test indicate that a zinc neutralized ionic copolymer results in higher impact resistance. The drop weight impact was measured using the procedure of ASTM D-2444 with the Gardner impact apparatus for measurement.

EXAMPLES 3-4

Examples 3 and 4 and Comparatives 1 and 2 contain polyepsiloncaprolactam of the type used in Examples 1 and 2. Examples 3 and 4 contain EEA 6169, as described in Examples 1 and 2. Example 3 and Comparative 1 contain Surlyn ® 1856 which is believed to be an ionic copolymer of ethylene and methacrylic acid and 1706 which is believed to be a copolymer of ethylene and methacrylic acid neutralized with zinc. The Surlyn 1706 has a melt flow index of 0.7 decigrams per minute, and specific gravity of 0.95.

Table II below shows the compositions used in determining the improvement obtained by replacing a portion of the Surlyn with ethylene-ethyl acrylate (EEA 6169). Also noted is the melt index and percent water of the final composition.

TABLE II

|  | Ex. 3 | Comp. 1 | Ex. 4 | Comp. 2 |
|---|---|---|---|---|
| Nylon 6 | 86 | 86 | 86 | 86 |
| EEA 6169 | 7 | 0 | 7 | 0 |
| Surlyn 1856 (Sodium) | 7 | 14 | — | — |
| Surlyn 1706 (Zinc) | — | — | 7 | 14 |
| Izod ft-lbs/in. notch | 2.50 | 2.18 | 2.82 | 2.35 |
| Melt Index g/10 min. | 4.11 | 3.97 | 4.53 | 3.87 |
| Percent Water | 0.19 | 0.18 | 0.19 | 0.19 |

In both cases, Example 1 and Comparative 1, and Example 2 and Comparative 2, the replacement of a portion of the Surlyn with EEA resulted in significant increases in the Izod impact strength.

EXAMPLES 5-11

Examples 5-11 are examples of compositions containing polyepsiloncaprolactam of the type described in Examples 1 and 2, 7 percent by weight of EEA 6169 produced by Union Carbide as discussed above, and 7 percent of various Surlyns being evaluated. Surlyns 1855, 1706, 1707, 1702, 1557, 1555, and 1650 were all used at a 7 percent by weight level. They are generally copolymer acids of ethylene and methacrylic acid neutralized by zinc or sodium as indicated in Table III below. Also indicated in Table III is a brief description of each Surlyn including its melt index (M.I.) in decigrams/minute. The melt indices of the compositions are in grams/10 minutes.

TABLE III

| | Surlyn Description | | | Composition Notched Izod | |
|---|---|---|---|---|---|
| Ex. | Grade | Metal | M.I. | ft-lb/in. notch | M.I. |
| 5 | 1855 | Zn | 1.0 | 3.0 | 4.3 |
| 6 | 1706 | Zn | 0.7 | 2.7 | 4.4 |
| 7 | 1707 | Na | 0.9 | 1.9 | 4.2 |
| 8 | 1702 | Zn | 14 | 2.3 | 4.4 |
| 9 | 1557 | Zn | 5.0 | 2.4 | 4.4 |
| 10 | 1555 | Na | 10.0 | 1.9 | 4.4 |
| 11 | 1650 | Zn | 1.5 | 2.8 | 4.4 |

EXAMPLE 12

Example 12 is a composition containing 71.85 percent by weight of azelaic acid terminated polyepsiloncaprolactam (nylon 6), ethylene-ethyl acrylate copolymer (EEA 6169) and zinc neutralized ethylene methacrylic acid copolymer. The ethylene-ethyl acrylate copolymer contained in the composition is the EEA 6169 described in Examples 1 and 2. The zinc neutralized copolymer of ethylene and methacrylic acid is Surlyn ® 1801. Surlyn 1801 has a melt flow index of 1.0 decigrams/minute (ASTM D-1238), and a specific gravity of 0.960. Additionally, zinc stearate has been added as a mold release agent. The composition of Comparative 3 was prepared in the same manner as Example 1. Comparative 3 contains no EEA. Comparative 3 and Example 12 are summarized in Table IV below:

TABLE IV

| | Comp. 3 | Ex. 12 |
|---|---|---|
| Nylon 6 | 71.85 | 71.85 |
| Surlyn 1801 | 28.00 | 24.00 |
| EEA | — | 4.00 |
| Zinc Stearate | .15 | .15 |
| Melt Index g/10 min. | 2.0 | 1.9 |
| Izod ft-lbs/in. notch | 3.8 | 15.1 |

This comparison shows that the replacement of 4.0 parts of the copolymer with an ester copolymer results in a surprising improvement in impact resistance with a total of 28 weight percent copolymer.

EXAMPLES 13-17

Examples 13-17 are blends of azelaic acid terminated polyepsiloncaprolactam, with Surlyn 1801 and EEA, DPD-6169. In these compositions, antimony oxide ($Sb_2O_3$) has been added to further improve impact resistance properties. Additionally, each of the formulations contains 0.25 percent by weight of zinc stearate for use as a mold release agent. Comparative 4 contains no EEA. Examples 13-17 contain 2-10 percent EEA. Comparative 4 and Examples 12-17 are summarized in Table V below.

TABLE V

| | Comp. 4 | Ex. 13 | Ex. 14 |
|---|---|---|---|
| Nylon 6 | 71.25 | 71.25 | 71.25 |
| Surlyn 1801 | 28.00 | 26.00 | 24.00 |
| EEA 6169 | — | 2.00 | 4.00 |
| $Sb_2O_3$ | 0.50 | 0.50 | 0.50 |
| Zinc Stearate | 0.25 | 0.25 | 0.25 |
| Melt Index g/10 min. | 1.6 | 1.7 | 1.6 |
| Izod ft.lbs./in. notch | 4.0 | 18.2 | 18.9 |
| Flex. Modulus × $10^{-5}$ psi | — | — | — |
| Yield Stress, psi | 8416 | 7577 | 7523 |
| Yield Elong., % | 7 | 7 | 6 |
| U. Tensile st. psi | 6100 | 6144 | 6775 |
| U. Elong., % | 146 | 116 | 244 |

| | Ex. 15 | Ex. 16 | Ex. 17 |
|---|---|---|---|
| Nylon 6 | 71.25 | 71.25 | 71.25 |
| Surlyn 1801 | 22.00 | 20.00 | 18.00 |
| EEA 6169 | 6.00 | 8.00 | 10.00 |
| $Sb_2O_3$ | 0.50 | 0.50 | 0.50 |
| Zn Stearate | 0.25 | 0.25 | 0.25 |
| Melt Index g/10 min. | 1.8 | 1.7 | 1.8 |
| Izod ft.lbs/in. notch | 17.9 | 17.9 | 17.4 |
| Flex. Modulus × $10^{-5}$ psi | 2.61 | 2.67 | 2.59 |
| Yield Stress, psi | 7340 | 7344 | 7400 |
| Yield Elong., % | 7 | 7 | 7 |
| U. Tensile st. psi | 6530 | 5893 | 5720 |
| U. Elong., % | 252 | 67 | 40 |

Merely replacing two parts of Surlyn 1801 with two parts of EEA 6169 results in a significant increase in Izod impact values which carries through in replacing as much as 10 parts of the Surlyn with EEA 6169. The highest impact value is found at approximately a 4 percent by weight EEA 6169, replacing 4 percent by weight of the Surlyn 1801. The reason for this spectacular increase in impact values at these levels is unknown at this time. It is speculated that the EEA 6169 in some way makes the nylon and the ionic copolymer, i.e. Surlyn 1801, more compatible. A review of the tensile elongation data at a 2 percent and 6 percent by weight replacement of a corresponding amount of Surlyn 1801 with EEA 6169 shows the maximum elongation values. It is presently preferred to use from 4 percent to 6 percent EEA 6169, and from 22 percent to 24 percent of the ionic copolymer.

EXAMPLE 18

Example 18 is a composition comprising polyepsiloncaprolactam which is azelaic acid terminated, ethylene-ethyl acrylate and Surlyn 1801. The composition additionally contains a small amount of magnesium oxide for improved impact resistance and a small amount of zinc stearate as a mold release agent. Comparative 5 contains no EEA 6169. The results are summarized in Table VI below.

TABLE VI

| | Comp. 5 | Ex. 18 |
|---|---|---|
| Nylon 6 | 71.65 | 71.65 |
| EEA 6169 | — | 4.00 |
| Surlyn 1801 | 28.00 | 24.00 |
| MgO | 0.20 | 0.20 |
| ZnST | 0.15 | 0.15 |
| Izod ft.lbs./in. notch | 4.7 | 19.8 |

In this composition the replacement of 4 percent by weight of Surlyn 1801 with ethylene-ethyl acrylate results in another dramatic increase in notched Izod values. Example 18 and Comparative 5 were run to corroborate the results of Table IV.

The above examples show that the impact resistance of a polyamide composition containing an ionic copolymer can be improved if a portion of the ionic copolymer is replaced by an ester copolymer such as ethylene-ethyl acrylate.

EXAMPLE 19

Example 18 was repeated using 4 weight percent ethylene methyl acrylate produced by Gulf Oil as Poly-Eth 2205 in place of 4 weight percent Surlyn 1801 of Comparative 5, 71.85 weight percent polyepsiloncaprolactam, 24 weight percent Surlyn 1801, 0.20 weight percent magnesium oxide. The Poly-Eth 2205 has a melt index of 2.4 and a 20 weight percent methyl acrylate content. The melt index was 1.71 gm/10 min. and the notched Izod ft. lbs/in. notch of 20.4.

EXAMPLE 20

A composition was prepared containing 72.95 percent polyepsiloncaprolactam which contained 10 percent caprolactam monomer. This composition contained 8 percent EEA 6169, 18 percent Surlyn 1801 and minor amounts of heat stabilizers and carbon black. The physical properties of the composition are sumarized in Table VII below:

TABLE VII

| Melt Index g/10 min | 3.10 |
| Izod ft.lbs/in. notch | 17.0 |
| Flex. stress, psi | 4680 |
| Flex. modulus × $10^{-5}$ psi | 1.23 |
| Yield Stress, psi | 5190 |
| Yield Elong, % | 29 |
| Ult. Tensile Strength, psi | 7915 |
| Ult. Elong, % | 275 |

EXAMPLE 21

A composition was prepared containing 69.10 percent polyepsiloncaprolactam having an excess of chain ends terminated with amine groups. This composition contained 7 percent EEA 6169, 23 percent Surlyn 1801, 0.75 percent antimony oxide, and 0.15 percent zinc stearate. The composition had a melt index of 1.10 g/10 min., and a notched Izod value of 16.9 ft.lbs./in notch.

EXAMPLE 22

The composition of the present invention has been extruded into a film. The composition comprised polyepsiloncaprolactam having a carboxyl group terminating one end and an amine group terminating the other end of the polyamide chains, 30 percent by weight of Surlyn 1801, 10 percent by weight of ethylene-ethyl acrylate copolymer (DPD-6169), and 0.25 weight percent antimony oxide ($Sb_2O_3$).

The composition was dry blended and extruded through a 1¼ inch Davis Standard Extruder having a 6 inch by 0.020 inch film. Film was drawn down to thicknesses of 0.0075 inches and 0.0025 inches. The tensile modulus of the film at 50 percent relative humidity using the ASTM D-882 Test Method was 71,700 psi.

While exemplary embodiments of the invention have been described, the true scope of the invention is to be determined from the following claims.

What is claimed is:

1. A composition comprising:
   about 46 percent to about 74 percent by weight of a polyamide;
   about 15 percent to about 44 percent by weight of an ionic copolymer of an alpha-olefin of the formula $RCH=CH_2$ where R is H or alkyl radicals having from 1 to 8 carbon atoms, and an alpha,beta-ethylenically unsaturated carboxylic acid having from 3 to 8 carbon atoms, the ionic copolymer having at least 10 percent of the carboxylic acid groups neutralized with metal ions; and
   about 1 percent to about 12 percent by weight of an ester copolymer of ethylene and an ester selected from the group of alkyl esters of alpha,beta-ethylenically unsaturated carboxylic acids having 3 to 8 carbon atoms wherein the alkyl group contains 1 to 4 carbon atoms.

2. The composition as recited in claim 1 wherein the random ionic copolymer is of ethylene and an alpha,-beta-ethylenically unsaturated carboxylic acid selected from the group of acrylic acid, and methacrylic acid, the ionic copolymer having at least 10 percent of the carboxylic acid groups neutralized with zinc.

3. The composition as recited in claims 1 or 2 wherein the ester copolymer is a copolymer of ethylene and an ester selected from the group of ethyl acrylate, methyl acrylate, ethyl methacrylate and methyl methacrylate.

4. The composition as recited in claim 3 wherein the polyamide is selected from the group of polyepsiloncaprolactam, polyhexamethyleneadipamide, and a mixture of polyhexamethyleneadipamide and polyepsiloncaprolactam.

5. The composition as recited in claim 3 wherein the ester copolymer is ethylene-ethyl acrylate.

6. The composition as recited in claim 5 wherein there is from about 57 percent to about 74 percent by weight of polyamide, from about 1 percent to about 8 percent by weight of ethylene-ethyl acrylate, and between about 20 percent and about 35 percent by weight of ionic copolymer.

7. The composition as recited in claim 6 wherein there is from about 60 perent to about 72 percent by weight of polyamide, from about 2 percent to about 6 percent by weight ethylene-ethyl acrylate, and from about 26 percent to about 34 percent by weight of a zinc neutralized ionic copolymer.

8. The composition as recited in claim 7 further comprising about 0.05 percent to about 1.0 percent by weight of the polyamide replaced by a corresponding amount of magnesium oxide.

9. The composition as recited in claim 7 wherein the ionic copolymer is the zinc neutralized copolymer of ethylene and methyl methacrylate.

10. The composition as recited in claim 7 wherein the polyamide is polyepsiloncaprolactam.

11. The composition as recited in claim 7 wherein the polyamide is polyhexamethyleneadipamide.

12. The composition as recited in claim 6 further comprising about 0.05 percent to about 1.0 percent by weight of a metal compound selected from the group of magnesium oxide and antimony oxide.

13. The composition as recited in claim 5 further comprising about 0.05 percent to about 1.0 percent by weight of a metal compound having a cation of a metal selected from the group consisting of antimony, copper, manganese, zinc, lithium, calcium and lead, and the metal compound having an anion selected from the group consisting of oxides, halides and acetates, the metal compound substituted for an equivalent amount of polyamide.

14. The composition as recited in claim 13 wherein the metal compound is selected from the group of magnesium oxide and antimony oxide.

15. The composition as recited in claim 14 wherein there is between about 0.2 percent and 0.6 percent by weight magnesium oxide.

16. The composition as recited in claim 1 further comprising up to 50 percent by weight of a filler and reinforcement.

17. The composition as recited in claim 1 further comprising up to 50 percent by weight of glass fibers.

18. The composition as recited in claim 1 in the form of a film.

19. A composition comprising:
about 46 percent to about 74 percent by weight of a polyamide;
about 15 percent to about 44 percent by weight of a random ionic copolymer of an alpha-olefin of the formula $RCH=CH_2$ where R is H or alkyl radicals having from 1 to 8 carbon atoms, and alpha,beta-ethylenically unsaturated carboxylic acid having from 3 to 8 carbon atoms, the ionic copolymer having at least 10 percent of the carboxylic acid groups neutralized with metal ions;
from 1 percent to about 10 percent by weight of an ester copolymer of ethylene and an ester selected from the group of alkyl esters of alpha,beta-ethylenically unsaturated carboxylic acids having 3 to 8 carbon atoms wherein the alkyl group contains 1 to 4 carbon atoms; and
from about 0.05 percent to 1.0 percent by weight based on the weight of the composition of a metal compound having the cation of a metal selected from Group IA, IB, IIA, IIB, IIIA, IVA, VA, VIB, VIIB, and VIIIB of the Periodic Table of the Elements, and the anion of the metal compound is selected from the group consisting of oxides, hydrides, formates, acetates, alcoholates, glycolates, and halides and wherein the notched Izod impact resistance of the composition is higher than for a like composition not containing the metal compound.

20. The composition as recited in claim 19 wherein the metal is selected from the group consisting of antimony, copper, manganese, zinc, lithium, calcium and lead and wherein the anion is selected from the group consisting of oxides, halides, and acetates.

21. The composition as recited in claim 20 wherein the metal compound is magnesium oxide.

22. The composition as recited in claim 21 wherein there is about 0.1 percent to about 0.75 percent magnesium oxide.

23. The composition as recited in claim 22 wherein there is about 0.1 percent to about 0.6 percent magnesium oxide.

24. The composition as recited in claim 20 wherein the metal compound is antimony oxide.

25. The composition as recited in claim 24 wherein there is about 0.1 percent to about 0.6 percent antimony oxide.

26. The composition as recited in claim 20 wherein the random ionic copolymer is of ethylene and an alpha,beta-ethylenically unsaturated carboxylic acid selected from the group of acrylic acid and methacrylic acid, the ionic copolymer having at least 10 percent of the carboxylic acid groups neutralized with zinc.

27. The composition as recited in claim 19 wherein the ester copolymer is a copolymer of ethylene and an ester selected from the group of ethyl acrylate, methyl acrylate, ethyl methacrylate and methyl methacrylate.

28. The composition as recited in claim 27 wherein the polyamide is selected from the group of polyepsiloncaprolactam, polyhexamethyleneadipamide and a mixture of polyhexamethyleneadipamide and polyepsiloncaprolactam.

29. The composition as recited in claim 27 wherein the ester copolymer is ethylene-ethyl acrylate.

30. The composition as recited in claim 28 wherein there is from about 57 percent to about 74 percent by weight of polyamide, between about 1 percent and about 8 percent by weight of ethylene-ethyl acrylate, and between about 20 percent and about 35 percent by weight of ionic copolymer.

31. The composition as recited in claim 30 wherein there is from about 60 percent to about 72 percent by weight of polyamide, from about 2 percent to about 6 percent by weight ethylene-ethyl acrylate, and from about 26 percent to about 34 percent by weight of a zinc neutralized ionic copolymer.

32. The composition as recited in claim 31 wherein the ionic copolymer is the zinc neutralized copolymer of ethylene and methyl methacrylate.

33. The composition as recited in claim 31 wherein the polyamide is polyepsiloncaprolactam.

34. The composition as recited in claim 31 wherein the polyamide is polyhexamethyleneadipamide.

35. The composition as recited in claim 19 further comprising up to about 50 percent by weight of a filler and reinforcement.

36. The composition as recited in claim 19 further comprising up to about 50 percent by weight of glass fibers.

37. The composition as recited in claim 19 in the form of a film.

38. A composition comprising:
about 46 percent to about 94 percent by weight of a polyamide;
about 5 percent to about 44 percent by weight of an ionic copolymer of an alpha-olefin of the formula $RCH=CH_2$ where R is H or alkyl radicals having from 1 to 8 carbon atoms, and alpha,beta-ethylenically unsaturated carboxylic acid having from 3 to 8 carbon atoms, the ionic copolymer having at least 10 percent of the carboxylic acid groups neutralized with metal ions; and
about 1 percent to about 12 percent by weight of an ester copolymer of ethylene and an ester selected from the group of alkyl esters of alpha,beta-ethylenically unsaturated carboxylic acids having 3 to 8 carbon atoms wherein the alkyl group contains 1 to 4 carbon atoms, there being a greater percent of the ionic copolymer than the ester copolymer.

39. The composition as recited in claim 38 wherein the random ionic copolymer is of ethylene and an alpha,beta-ethylenically unsaturated carboxylic acid selected from the group of acrylic acid and methacrylic acid, the ionic copolymer having at least 10 percent of the carboxylic acid groups neutralized with zinc.

40. The composition as recited in claim 38 or 39 wherein the ester copolymer is a copolymer of ethylene and an ester selected from the group of ethyl acrylate, methyl acrylate, ethyl methacrylate and methyl methacrylate.

41. The composition as recited in claim 40 wherein the polyamide is selected from the group of polyepsiloncaprolactam, polyhexamethyleneadipamide and a mixture of polyhexamethyleneadipamide and polyepsiloncaprolactam.

42. The composition as recited in claim 40 wherein the ester copolymer is ethylene-ethyl acrylate.

43. The composition as recited in claim 42 wherein there is between about 62 percent to about 78 percent by weight of polyamide, between about 2 percent and about 8 percent by weight of ethylene-ethyl acrylate, and between about 14 percent and about 36 percent by weight of ionic copolymer.

44. The composition as recited in claim 43 wherein there is between about 68 percent and about 74 percent by weight of polyamide, between about 3 percent and about 7 percent by weight ethylene-ethyl acrylate, and between about 19 percent and about 29 percent by weight of a zinc neutralized ionic copolymer.

45. The composition as recited in claim 44 further comprising about 0.05 percent to about 1.0 percent by weight of the polyamide replaced by a corresponding amount of magnesium oxide.

46. The composition as recited in claim 44 wherein the ionic copolymer is the zinc neutralized copolymer of ethylene and methyl methacrylate.

47. The composition as recited in claim 44 wherein the polyamide is polyepsiloncaprolactam.

48. The composition as recited in claim 44 wherein the polyamide is polyhexamethyleneadipamide.

49. The composition as recited in claim 43 further comprising about 0.05 percent to about 1.0 percent by weight of a metal compound selected from the group of magnesium oxide and antimony oxide.

50. The composition as recited in claim 42 further comprising about 0.05 percent to about 1.0 percent by weight of a metal compound having a cation of a metal selected from the group consisting of antimony, copper, manganese, zinc, lithium, calcium and lead, and a metal compound having an anion selected from the group consisting of oxides, halides and acetates, the metal compound substituted for an equivalent amount of polyamide.

51. The composition as recited in claim 50 wherein the metal compound is selected from the group of magnesium oxide and antimony oxide.

52. The composition as recited in claim 51 wherein there is between about 0.1 and 0.35 weight percent magnesium oxide.

53. The composition as recited in claim 39 in the form of a film.

* * * * *